Sept. 22, 1953 C. D. DOSKER 2,652,870
CONTINUOUS PLANAR TYPE PANEL FORMING MACHINE
Filed Jan. 15, 1948 4 Sheets-Sheet 2
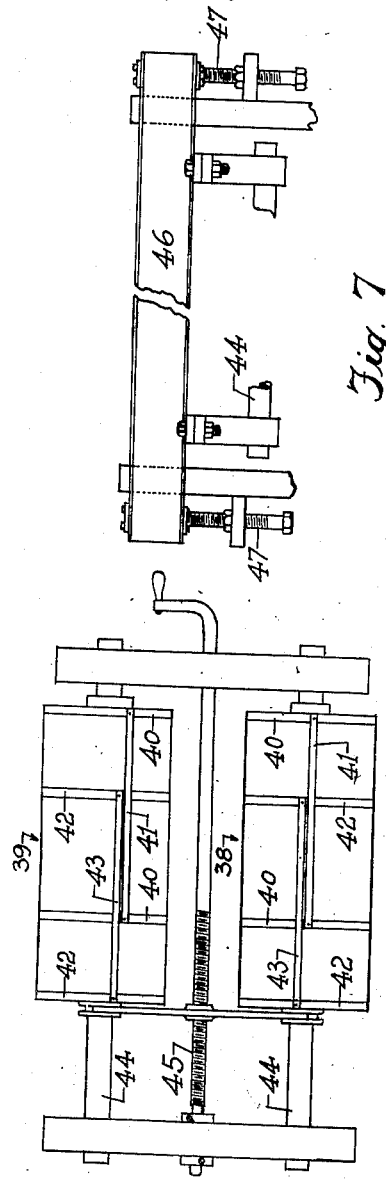
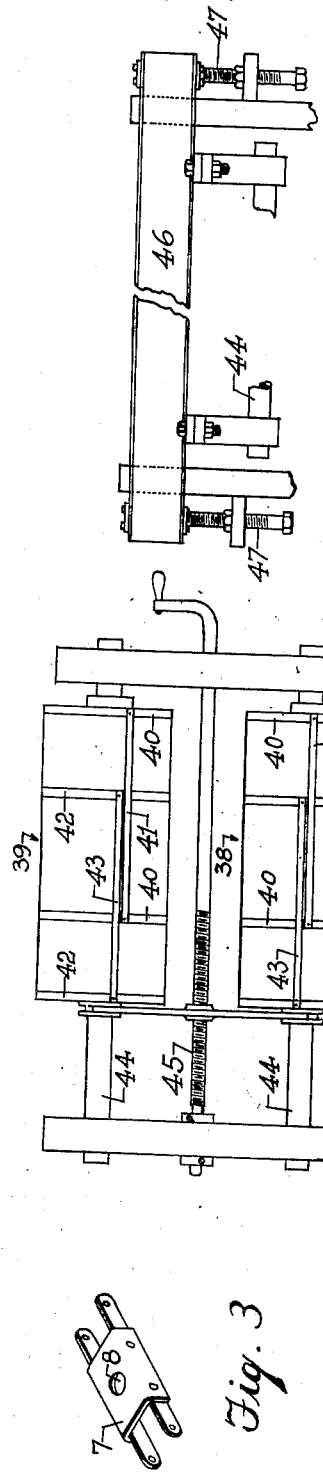
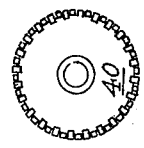
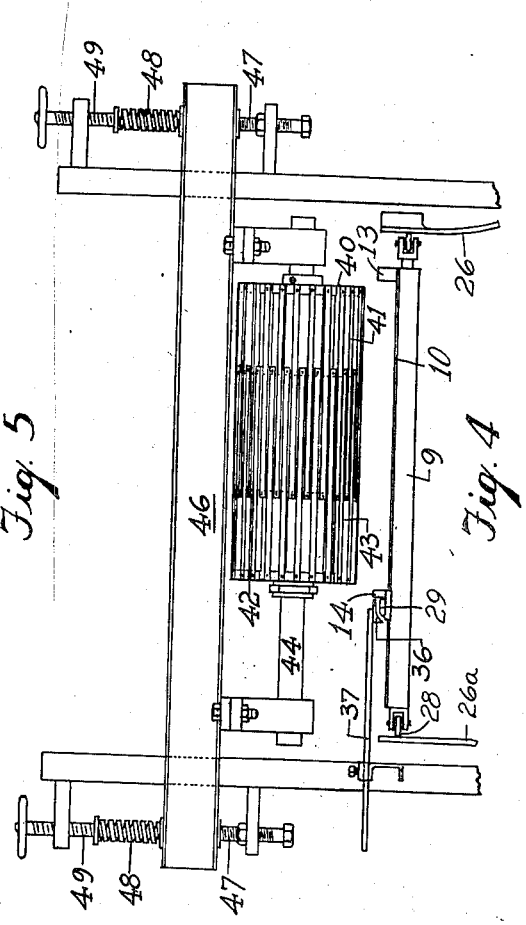
INVENTOR.
Cornelius D. Dosker
BY
Arthur H. Robert
ATTORNEY Sept. 22, 1953 C. D. DOSKER 2,652,870
CONTINUOUS PLANAR TYPE PANEL FORMING MACHINE
Filed Jan. 15, 1948 4 Sheets-Sheet 3
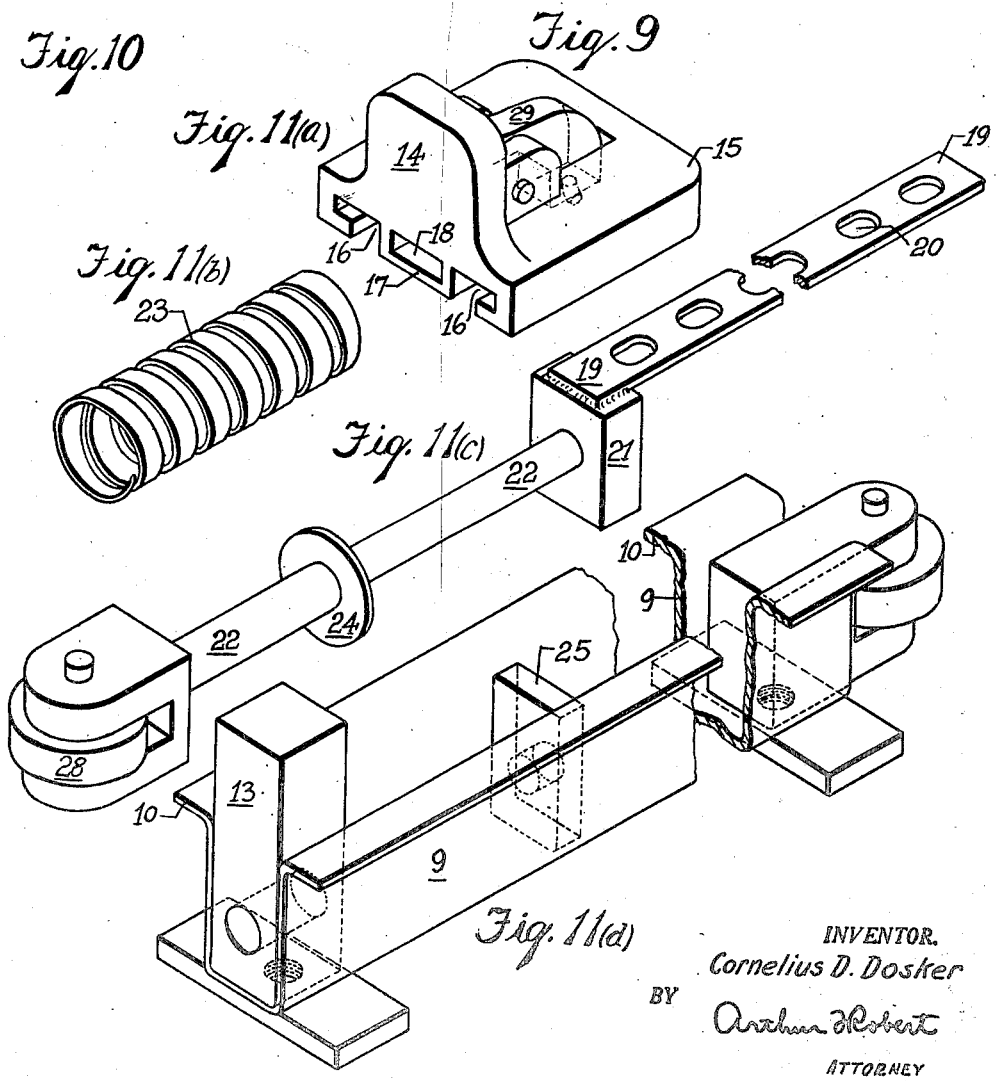
INVENTOR.
Cornelius D. Dosker
BY
ATTORNEY

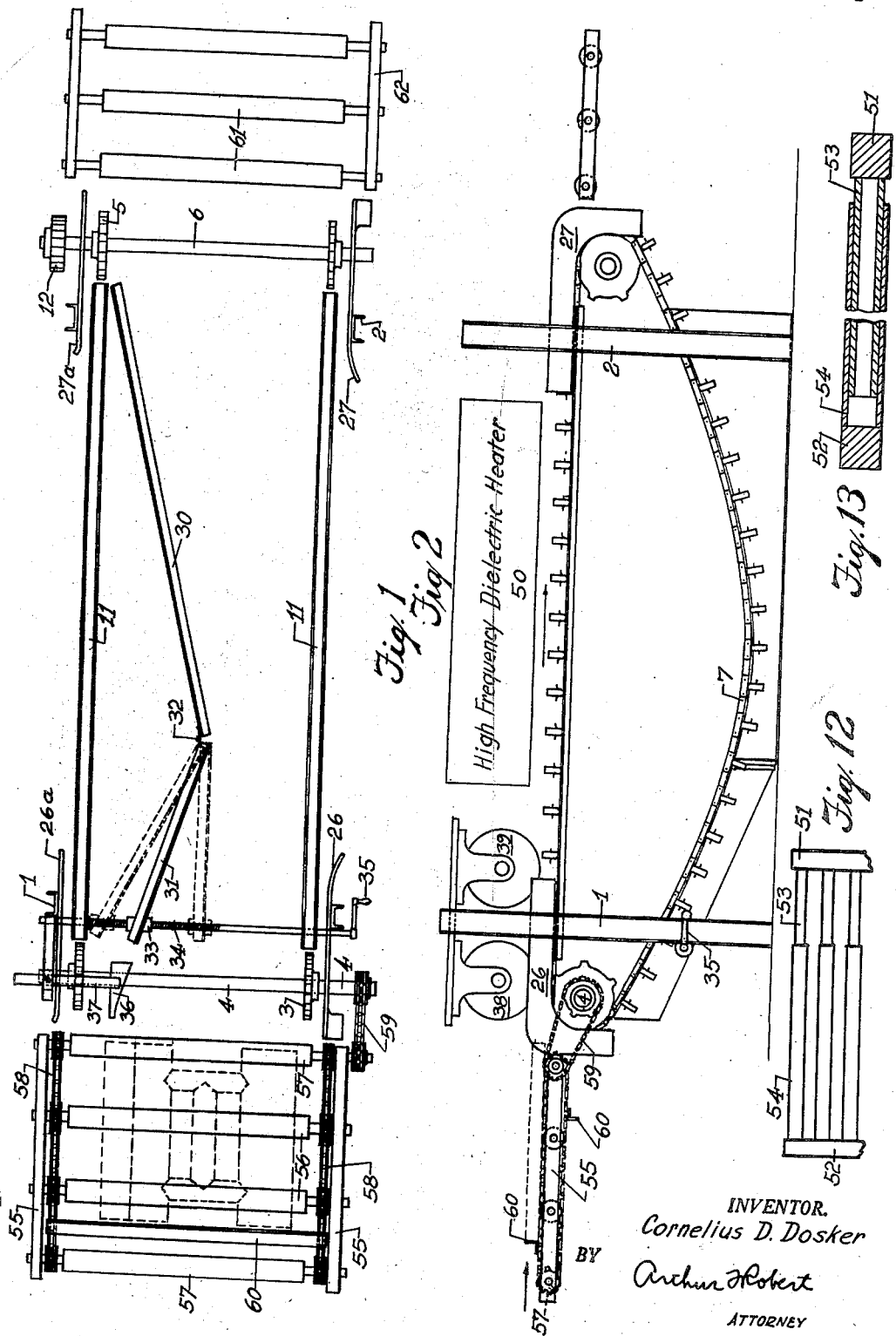

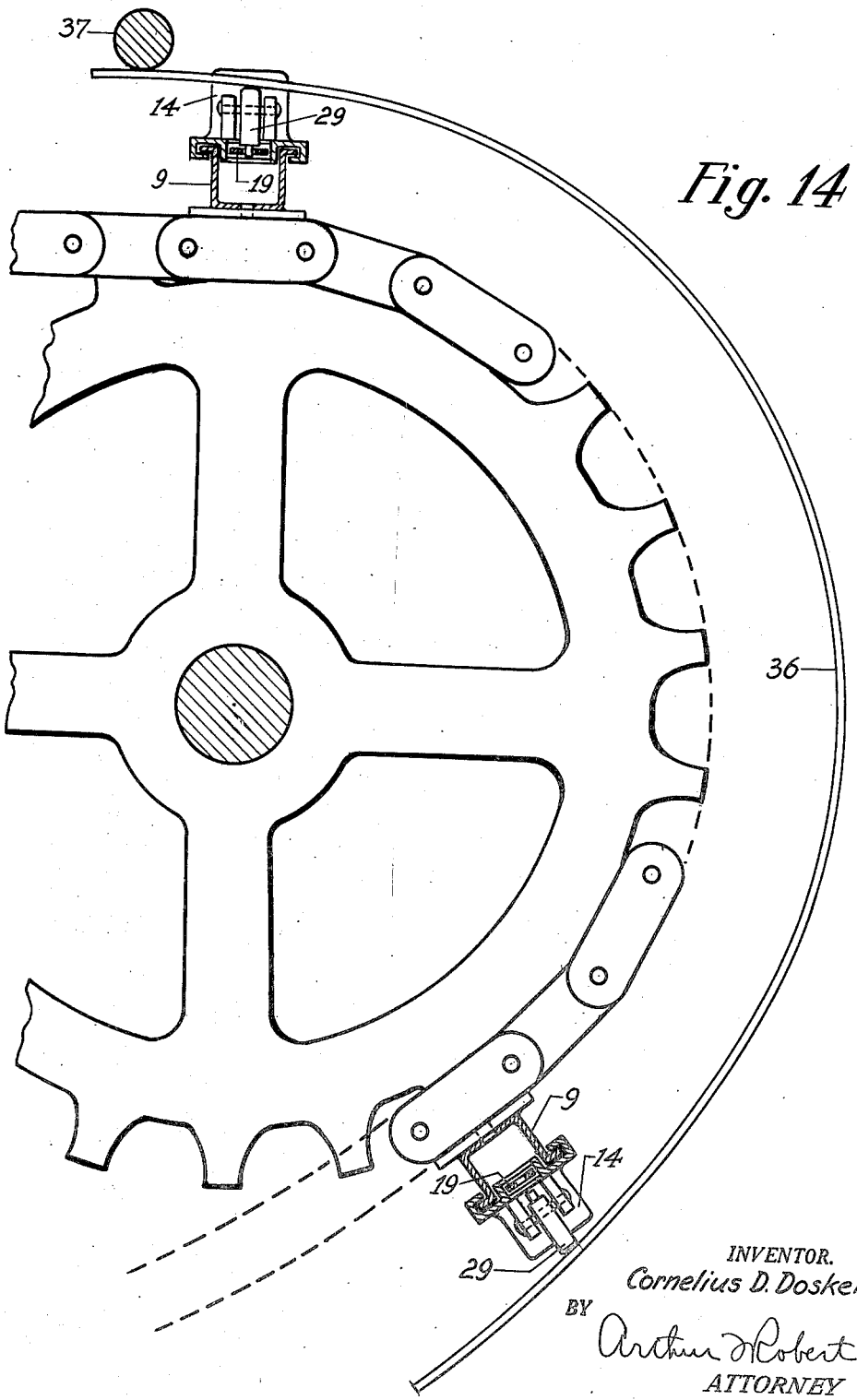

Patented Sept. 22, 1953

2,652,870

UNITED STATES PATENT OFFICE 2,652,870

CONTINUOUS PLANAR TYPE PANEL FORMING MACHINE

Cornelius D. Dosker, Louisville, Ky., assignor to Gamble Brothers, Inc., Louisville, Ky., a corporation of Kentucky Application January 15, 1948, Serial No. 2,385

20 Claims. (Cl. 144—281)

This invention has particular reference to panel-forming machines for (a) receiving an assembly of abutting boards having their abutting surfaces precoated with an unset glue-like medium, (b) clamping the precoated boards in assembled panel-forming relationship and (c) holding them in such relationship while the glue sets and bonds the boards together.

Panel forming devices are old. Thus U. S. patents to Mahar 765,744 and Bowling 2,320,715 disclose proposed batch type devices wherein precoated board assemblies of predetermined width and length are compressed between side clamps and top and bottom clamps and stationarily held while the glue sets.

U. S. patents to Billstrom 740,219, Palmer 1,420,941, Francis 1,981,499 and Billstrom et al. 2,321,644 disclose the revolving clamp carrier or continuous radial type of device wherein successive precoated board assemblies of predetermined length and width are manually placed upon successive clamping frames, which are positioned at endlessly spaced intervals along and secured to an endless conveyor to extend outwardly therefrom at right angles to conveyor movement, manually clamped and flattened upon each carrier, bodily carried thereby along an endless path extending into and out of one end of an oven which sets the glue, and then manually released and removed.

U. S. patents to Sutter 915,504 and Hall 2,408,064 disclose what may be called the continuous planar type of device wherein a succession of precoated boards of predetermined width are successively fed to and placed transversely across one end of the upwardly-facing forwardly-moving planar surface of an endless conveyor which carries the boards forwardly in assembled relationship while forwardly positioned means are intended to retard the forward movement of the boards sufficiently to place and maintain their precoated front and rear transverse edges under compression while the glue sets. This type is intended to produce panels of predetermined width and of prescribed or indeterminate length.

Batch type devices are not widely used because they have a low productive capacity, require considerable hand labor and are not usually suited to the production of a wide range of differently sized panels. The continuous planar type is not used to any great extent because of the difficulties encountered in developing it to a point where it operates satisfactorily and with sufficient productive capacity to warrant use. The continuous radial type is in wide use today despite the fact that it occupies considerable space, requires considerable hand labor and although capable of producing a wide range of differently sized panels, is not highly suited to such production. While its productive capacity is somewhat limited, such capacity is so much higher than that of the other types above-mentioned, that the trend of present day development work on panel-forming machines is largely directed to the improvement of the radial type.

The principal object of the present invention is to provide a continuous panel-forming machine which is relatively compact, which performs the panel flattening, clamping and releasing operations automatically and effectively over speeds ranging upwardly from the slow speeds heretofore considered satisfactory to those as much as five times faster, which is admirably suited to the continuous and rapid production of panels of variable widths and thicknesses over entirely satisfactory ranges and of variable lengths ranging from 15″, more or less, up to any desired length that may be practical to handle, which otherwise substantially minimizes, if it does not entirely eliminate, the objections of all of the foregoing types without introducing any other significant objections and which substantially reduces the cost heretofore involved in the quantity production of panels.

Another important object is to provide a highly successful continuous planar type of panel- forming machine wherein precoated board assemblies of predetermined width and of either predetermined or indeterminate length may be rapidly fed into one end of the machine, continuously and rapidly moved by the machine through flattening, clamping, setting and releasing areas and, during such movement, automatically flattened in the flattening area, automatically clamped in assembled panel-forming relationship in the clamping area, quickly bonded together in the glue-setting area while remaining firmly clamped and automatically released at the releasing area where the finished panel may be discharged from the delivery end of the machine.

Another object of the invention is to provide a continuous planar type of machine in which forwardly moving panels are engaged along opposite sides by opposed clamping members and compressively clamped between such members at right angles to the direction of panel movement leaving the upper face of the clamped panel openly accessible so that it may be closely approached by the mechanism for setting the glue.

Another object is to provide a continuous planar type of machine utilizing a succession of side clamps for successively engaging successive side portions of the panel to effect a progressive clamping of the panel and thereby minimize the formation of strains in the panel.

A further object is to provide a continuous planar type of machine which may be easily and quickly adjusted to accommodate panels of different predetermined widths.

A panel-forming machine of the continuous planar type, constructed in accordance with my invention, is illustrated in the accompanying drawing wherein:

Fig. 1 is a partly diagrammatic plan view thereof omitting portions of the upper structure such as the conveyor, the clamps and the high frequency assembly;

Figure 2 is a side elevation of the embodiment of Fig. 1 with the conveyor, clamps and high frequency assembly added;

Figure 3 is a perspective of the preferred form of conveyor element employed;

Figure 4 is a front elevation of the entrance end of the clamping conveyor, the showing being partly diagrammatic;

Figure 5 is a plan of the pressure roller assembly, showing its method of adjustment;

Figure 6 is an end elevation of a pressure roller;

Figure 7 is an end elevation of a modified support for the pressure roller assembly;

Figure 8 is a plan of a preferred form of traveling clamp;

Figure 9 is a side elevation of the clamp of Fig. 8;

Figure 10 is a front elevation of the clamp of Fig. 9;

Figure 11a, 11b, 11c and 11d collectively constitute an exploded view of the clamp of Fig. 8 with the several elements thereof shown in perspective;

Figure 12 is a partly broken plan view of the expanded-retractable high frequency electrode used over the conveyor;

Figure 13 is an enlarged sectional view taken along line 13—13 of Figure 12; and Figure 14 is an enlarged view showing the operation of the cam or guide plate 36 in contacting and operating the latching member 29 at the feed end of the machine.

The panel forming machine illustrated in the drawings comprises: (1) a conveyor assembly for (a) receiving an assembly of abutting boards having an unset glue-like medium between such of their abutting surfaces as are to be bonded together, and (b) transporting said board assembly over a predetermined planar path extending from the board assembly receiving area of the conveyor through a glue setting area to a releasing area (2) a clamping assembly for initially engaging the board assembly along its opposite sides at the receiving area and disengaging it at the releasing area, the clamping assembly being operative (a) to clamp the board assembly at the receiving area, (b) to hold it in a clamped condition as it goes through the setting area where the glue-like medium sets and bonds the precoated abutting surfaces together to unify the board assembly and (c) to release the unified assembly at the releasing area; (3) flattening means over the receiving area of the machine for pressing the precoated boards against the conveyor; (4) glue-setting means over the setting area of the conveyor for curing or otherwise setting the glue-like medium between the abutting surfaces of the board assembly as it moves toward the delivery end so as to bond the boards into a panel; (5) a feeding assembly for feeding the boards onto the receiving end of the conveyor; and (6) a receiving assembly for receiving the panel from the delivery end of the conveyor.

CONVEYOR ASSEMBLY

The conveyor assembly comprises: a frame; an endless conveyor mounted on the frame and having upper and lower runs extending between its feed and delivery ends with its upper run presenting a more or less horizontal upwardly-facing substantially planar supporting surface; guide means for the upper run of the conveyor; and drive means for the conveyor.

Frame

Any suitable conveyor frame may be employed; hence the present frame is simply indicated by one pair of transversely spaced upright legs 1 composed of U-shaped channels located at the receiving end of the conveyor and a similar pair of legs 2 at the delivery end thereof. Necessarily these will be united by a suitable arrangement of longitudinal and cross beams and other braces to form a rigid frame.

Endless conveyor

Any suitable endless conveyor may be employed. The conveyor illustrated comprises: one pair of transversely spaced sprockets 3 carried, at the receiving end of the conveyor, by shaft 4 which is rotatably mounted in any suitable manner upon the frame; a similar pair of delivery end sprockets 5 on a similar shaft 6; a pair of transversely spaced chain belts 7, one for the sprockets 3 and 5 on each side of the machine, each belt being composed of the succession shown in Fig. 3 of spaced U-shaped channel bearing plates, which are also designated by the numeral 7, each plate having front and rear pairs of transversely spaced arms for pivotally connecting it to the corresponding arms of adjacent plates and containing a central opening 8 in its bight; and a corresponding succession of spaced outwardly open U-shaped cross channel members 9 extending transversely from a bearing plate of one chain 7 to the corresponding bearing plate of the other chain, each cross channel member 9 being bolted to each of its bearing plates 7 by a suitable bolt passing through the bearing plate opening 8, the outer edges of each cross channel 9 being laterally turned to form flanges 10 which extend in a plane parallel to the general direction of movement of the cross channel from which they extend.

Guide means

The upper run of each belt 7 is guided in and slidably supported along a straight path of movement by an upwardly open U-shaped channel member 11. Each guide channel 11 is suitably mounted on the frame to extend longitudinally between corresponding sprockets 3 and 5 preferably at an elevation such as to receive the upper run within the channel and maintain such run at a level corresponding to that occupied by the belt links at the tops of the sprockets 3 and 5. By supporting and guiding the upper run in this manner, the flanges 10 of the cross channels 9 will cooperate to form a more or less horizontal upwardly-facing substantially planar supporting surface for transporting the panel forming boards on the upper run of the conveyor from the receiving end of the machine to its delivery end.

While a horizontal planar supporting surface is preferred, it will, of course, be understood that such supporting surface may be arranged to incline from one side of the machine to the other so long as it remains planar. In either event, however, the planar surface will be upwardly facing. The lower run of the conveyor may be likewise or otherwise guided and supported but preferably it is permitted to hang freely so that it extends arcuately from one set of sprockets to the other.

*Drive means*

A drive sprocket or gear 12 is fixed upon the delivery end shaft 6, adjacent one end thereof to drive the conveyor from a variable speed electric motor or other speed varying power means which is not shown. The conveyor may be driven intermittently but preferably is driven continuously in a direction to cause its upper run to move toward the delivery end. While the operating speed employed will depend on various factors, a range providing a planar surface speed of 4 to 30 lineal feet per minute will normally be sufficient.

CLAMPING ASSEMBLY

The clamping assembly comprises: (a) clamp members arranged along opposite sides of said predetermined path of planar movement for limited transverse movement into and out of clamping relationship; (b) clamp operating mechanism for transversely moving said clamping members to clamp the incoming boards and release the resulting outgoing panels; and (c) means for adjusting the clamp members for operation with panels of different predetermined widths.

*Clamp members*

While it is not essential that the clamp members be arranged to move with the conveyor, an arrangement in which such members move with the conveyor is preferred and shown. As shown, it comprises a pair of relatively movable clamping members 13 and 14 mounted on each cross channel 9.

The clamp member 13 is preferably fixedly mounted in one end of the cross channel 9, this member preferably extending from the base of the cross channel outwardly beyond the planar forming flanges 10 sufficiently to provide a suitable abutment for one side of a panel forming assembly of boards. The member 13 may be welded or otherwise secured to the cross channel 9.

The other clamping member 14 is slidably mounted on the cross channel 9 preferably in a way such as to reduce side play or wobble to a minimum. Accordingly, it is integrally formed on a slide plate 15 having a pair of elongate slots 16 to receive the lateral flanges 10 of the cross channel 9 and a bottom shoulder or ridge 17, which depends from its bottom face into a suitably snug sliding fit with the inner side walls of the cross channel. This bottom shoulder 17 contains a slot 18 to receive the clamp operating extension hereinafter described.

*Clamp operating mechanism*

The operating mechanism for moving the clamp members 13 and 14 relatively toward and away from each other comprises: (a) an operating extension connected to the movable clamp member 14 and slide plate 15; (b) spring means for moving that extension and clamp member 14 in one direction; and (c) cam or frame-mounted means for moving such parts in the opposite direction.

The operating extension for the movable clamp member 14 comprises: (a) a strap 19 extending through the slot 18 and mechanically connected within the slot to the plate 15, the strap having a series of perforations 20 at regular intervals along its length; (b) a slide block 21 slidably mounted within the cross channel 9 with its upper end rigidly connected to one end of the strap 19; and (c) a rod 22 extending within the cross channel 9 from one face of the slide block 21, to which it is rigidly secured, up to the lower end of the stationary clamp member 13 and projecting, through a suitable opening in clamp member 13, horizontally outward from member 13 and the corresponding side of the conveyor.

The spring means of each clamp operates to urge the operating extension transversely, as a unit, in the general direction of the stationary clamping member 13. The slidably movable plate 15 and clamping member 14 are thus biased toward the clamping position. Accordingly, a spring 23 is arranged to encircle the rod 22 with one end pressing against a washer 24, which is positioned on the rod 22 to abut a shoulder made by enlarging the rod, and with its other end abutting against a stationary anchor block 25 which is rigidly secured to the cross channel 9 at a point between the spring 23 and the slide block 21. The spring 23 thus works against the anchor block 25 and tends to force the rod 22 to a position of maximum projection wherein the washer 24 engages the lower end of stationary clamping member 13 to prevent further outward movement. Where successive clamps are spaced on 6" centers, good results have been obtained with 1000 pound compression springs.

The cam means for all clamps operates to depress the projecting end of each operating extension and thus move that extension, as a unit, in the general direction of the movable clamping member 14. In so doing, it compresses the spring 23 and positively moves the movable clamping member 14 to the open or unclamping position. The cam means comprises: (a) a cam member 26 mounted on the frame adjacent the receiving end of the conveyor; and (b) another cam member 27 mounted on the frame adjacent the delivery end thereof. Each of the cams 26 and 27 is positioned along the path of movement of the projecting ends of the operating extension rods 22.

The cam 26 depresses the projecting ends of successive rods 22 successively as they move upwardly around the receiving end sprockets and maintains the clamps open long enough to permit the introduction of a loose assembly of boards. It may terminate at that point to permit the compressed spring 23 to effect a quick closure of the clamp but it preferably is sloped outwardly to allow the spring to effect a gradual closure thereof. The complete closure of the clamp is effected before it reaches the glue curing area and it remains closed as it passes through that area.

The cam 27 at the delivery end of the machine is arranged to open the clamps successively as they approach the delivery end and maintain them open until they pass downwardly around the delivery end sprockets beyond the reach of the panel. To reduce the friction between the cams 26 and 27 and the projecting ends of the operating extension rods 22, the latter are each provided with a roller 28.

Also, to prevent any lateral movement of the conveyor, when the cams 26 and 27 operate to open the clamps, the opposite side of the frame is provided with abutment plates 26a and 27a, which are disposed oppositely to the cams 26 and 27, while the corresponding ends of the cross channels 9 are each provided with a roller 28a for engaging these abutment plates during the cam engaging intervals. The abutment plates hold the cross channels 9 against lateral movement during the operation of the cams and thus avoid the strain which such movement would place on the chain belts 7 and the distortion to which it would subject the panels.

Clamp adjusting means

It will be noted that the operating extension always operates between the same limits. Accordingly, in order to accommodate panels of different predetermined widths during different operating intervals, the movable clamp 14 and slide plate 15 are adjustably connected to the operating extension to enable the mouth of the clamp to be widened or narrowed. To this end, the strap 19 is provided with a series of perforations 20 while the plate 15 carries a pivotally mounted latch 29 which is arranged to pass through an opening in plate 15 and to extend into one perforation 20 or another in order to lock the movable clamp 14 in a corresponding position. The perforations 20 thus extend over a latching band and the movable clamp 14 may be latched at various predetermined positions within that band.

Each movable clamp 14 may be manually adjusted from one position to another within the latching band. To avoid the time and labor involved in effecting the separate manual adjustment of each clamp, each latch 29 is arranged to drop gravitationally out of and back into its latching position respectively at the beginning and the end of its return travel and a reset means is provided underneath the return run of the conveyor for directing each unlatched clamp to any desired position which may be predetermined by one manual adjustment. This reset means comprises: (a) a return rail 30 arranged underneath the conveyor to extend from adjacent the delivery end of the machine part way toward the receiving end thereof not only at an angle such as to cross the entire latching band but in a position such as to intercept each unlatched movable clamp 14 as it undergoes return movement and slidably move it across the band to one margin or the other thereof where it passes from the discharge end of rail 30, the margin in this case corresponding to the narrowest clamp opening; and (b) a reset rail 31 arranged underneath the conveyor to extend from adjacent the discharge end of return rail 30 toward the receiving end thereof, the reset rail 31 being positioned to intercept each unlatched clamp 14 leaving rail 30 and slidably move it back across the latching band to the desired predetermined position where it passes from the discharge end or terminal of the reset rail; (c) means for hinging the receiving end of reset rail 31; (d) manually operable means for adjusting the discharge terminal of the reset rail 31 to discharge the unlatched clamps at any desired position within the latching band; and (e) manually adjustable relatching means for engaging each reset unlatched clamp to force it into latching position as it moves around the receiving end of the conveyor.

The return rail 30 is suitably mounted on the frame. Both rails 30 and 31 are shaped to conform to the contour of that portion of the lower run of the conveyor along which they respectively extend. The receiving end of the reset rail 31 is hinged at 32 to the discharge end of return rail 30 while its discharge terminal is suitably connected by a threaded collar 33 to a transverse adjustment screw 34 suitably mounted on the frame and provided with a handle 35 for effecting the adjustment. The manually adjustable relatching means includes a cam plate 36 arranged to curve upwardly around the delivery end of the conveyor and mounted on an adjusting rod 37 so that it may be adjustably located in a position to engage each latching member 29 as it moves upwardly around the delivery end and force such member downwardly into latching engagement with operating extension strap 19.

FLATTENING MEANS

Boards may be fed into the machine for producing a series of panels of prescribed length or for producing a panel of more or less continuous length; hence such boards may be of the same length or they may vary in length as circumstances permit. The individual boards may also vary in width so long as they collectively form a panel of predetermined width but they should be substantially straight or unwarped and of substantially the same thickness. It is desirable for them to lie flat on the conveyor so that opposite faces of the ultimate panel will be sufficiently planar to minimize, if not entirely to avoid, subsequent machining. It is to insure flatness, that the flattening means is provided over the receiving end of the conveyor for pressing the precoated boards flatly against the conveyor and maintaining them in flat and uniform engagement with the conveyor until they are effectively clamped.

The flattening means includes a pair of freely rotatable vertically adjustable axially extensible rolls 38 and 39 positioned one after the other to extend transversely over the receiving end portion of the conveyor at an elevation such that they will press downwardly against the entering assembly of boards. Each of the rolls 38 and 39 is made up of a pair of interengaging squirrel cage sections which are relatively movable axially to enable the roll to be axially widened or shortened in accordance with the width of the incoming board assemblies.

One squirrel cage section comprises a pair of axially spaced discs 40 and a series of peripheral cross bars 41 while the other section comprises a similar pair of axially spaced discs 42 and a peripheral series of cross bars 43. One disc of each section is arranged within the squirrel cage of the other section while the peripheral cross bars 41 and 43 of both sections are spaced apart sufficiently to receive the cross bars of the other section. Thus when the rolls are axially shortened, each disc of one section will approach the corresponding disc of the other section whereas, when the roll is axially lengthened, each disc on one section will recede axially away from the corresponding disc on other section.

The rolls 38 and 39 are mounted upon separate freely rotatable shafts 44 with one section of each roll fixed to its shaft to remain over that portion of the conveyor adjacent the fixed clamp 13 and with the other section of each roll arranged for axial adjustment along its shaft to extend or retract the roll. The outermost discs 42 of the axially movable sections are connected to an adjusting screw 45 so that both sections may be simultaneously adjusted to lengthen or shorten the rolls 38 and 39 as desired.

The roll adjusting screw 45 and both shafts 44 are mounted on a cross beam 46 which is carried by a pair of frame-supported vertical adjusting screws 47 so that the rolls may be raised and lowered. Preferably each roll is lowered to a position such that it will be lifted slightly by the incoming board assembly which will then bear the full weight of the roll plus the force of the springs 48 which encircle the adjusting screw and which may be adjustably compressed by screws 49 for varying the force with which they resiliently press the rolls downwardly. However, where the weight of the roll is sufficient for flattening purposes, the spring may be omitted and the arrangement shown in Figure 7 utilized.

The clamps operate to clamp the boards into a tight panel forming assembly while the boards are held flat by one or both flattening rolls 38 and 39. This insures the delivery of flat panels into the curing area.

GLUE SETTING MEANS

Where the glue used will cure or set rapidly at room temperature to produce a good bond, it will not be necessary to employ any glue setting means other than a clamp conveyor for holding the assembly in a tightly clamped condition for the time required to effect a satisfactory cure.

On the other hand, where the application of curing or setting heat is either desirable or necessary, it is preferably accomplished by subjecting the panel to an electric high frequency field from a suitable source. For this purpose a high frequency dielectric heating unit 50 of any satisfactory type is positioned over the conveyor and energized to subject the longitudinal glue joint lines to a glue setting heat, the metal conveyor acting as a grounding electrode for the high frequency unit. With units of this character, the setting of the glue can be accomplished in a matter of 20 to 40 seconds more or less as compared to the 3 to 5 minutes or more normally required in a steam oven. However, it will be appreciated that any glue setting means may be employed, the advantage of a high frequency unit being the very short time required to effect a good bond.

High frequency units normally employ an energized plate type of electrode. An electrode of this character may be employed here and positioned to extend over whatever glue setting area is required. I prefer an energized electrode of the novel form shown in Figures 12 and 13 comprising: a pair of transversely spaced metal frame members 51 and 52; a series of transversely extending metal tubes 53 secured to one frame member 51; and a corresponding series of tubes 54 secured to the other frame member 52, each tube 54 being telescopically fitted into its corresponding tube 53 to permit the widening and narrowing of the energized electrode so as to accommodate board assemblies of different widths.

An energized electrode of this type has the advantage of limiting any arc-over from the electrode to the panel. For example, in a plate electrode arc-over, the arc will often travel along the plate with the board assembly. This robs the rest of the electrode of its energy and correspondingly reduces the degree of glue curing or setting in other parts of the board assembly. On the other hand, where transverse tubes are employed as electrodes, the arc travels across part of the width of the tube and then breaks. Consequently a uniform degree of glue curing or setting is obtained over the entire panel.

FEEDING ASSEMBLY

The feeding assembly may be of any suitable form, the assembly shown including a frame 55 mounting a pair of transversely extending centrally disposed idling rollers 56 flanked by a pair of spaced driving rollers 57 which carry sprockets connected to each other by a pair of oppositely disposed sprocket chains 58. One of the drive rolls 57 carries another sprocket which is driven by chain 59 from a sprocket on the conveyor shaft 4. The oppositely disposed sprocket chains 58 for the rollers 57 cooperate to carry longitudinally spaced transversely arranged angle irons 60 extending from one chain to the other. These angle irons 60 act as pusher bars for pushing a loose assembly of boards placed on the rollers upon the receiving end of the conveyor. An assembly of boards, in position for delivery by the feed assembly to the conveyor assembly, is indicated in dotted lines in Figure 1.

RECEIVING ASSEMBLY

It will be appreciated that the panels discharged from the delivery end of the conveyor may be picked up manually or otherwise for transportation to some other location or fed into another machine for performing some operation on the panels such as a machining operation or to any form of receiving assembly for one or the other of the purposes above enumerated. Accordingly, the receiving assembly is conventionally shown in the drawings in position to receive panels from the delivery end of the conveyor, this assembly comprising a series of rollers 61 rotationally mounted upon a frame 62.

OPERATION

Since the operation will be clear from the foregoing, it should suffice to say that a loose assembly of boards capable of forming a panel of predetermined width and having each of its joint lines which are to be bonded, precoated with a settable glue, is placed upon the feed assembly which feeds it onto the conveyor underneath the flattening rolls. As the conveyor carries the loose assembly forwardly and while the rolls maintain the assembly pressed flat against the conveyor, the clamps operate successively to engage and tightly clamp successive oppositely disposed side edge portions of the board assembly with the result that a substantially flat tightly clamped panel forming assembly is ultimately fed into the glue setting area.

As the tightly clamped assembly passes through the setting area, the high frequency dielectric unit 50 operates quickly to set the glue and provide a strong bond uniting the various boards into a unitary panel. At the delivery end of the conveyor, the clamps successively release the finished panel so that it is ultimately delivered upon the receiving assembly.

As the movable clamps pass around the delivery end to make the return run, they become successively unlatched. During the return movement, each unlatched clamp member is first slidably moved transversely to one side of the latching band by the return rail and then slidably moved by the reset rail, back transversely across the latching band to the predetermined position to which the reset rail is adjusted. Thereupon the clamps pass upwardly around the delivery end. During this phase of the travel, the clamps are opened by the frame cams and relatched so as to be in condition to receive the next incoming panel.

Board assemblies fed to the machine should be of a predetermined width and of uniform thickness. Excellent results have been obtained in fabricating panels ranging from 15 to 37" in width and from ¾" to 2" in thickness with lengths ranging from 15" upwardly. The flattening means should force the panels rigidly against the planar surface. However, when this occurs, the individual boards of the panel may not have uniformly flush joint line engagement if one or more of the boards have some degree of warp or twist. Accordingly, the side clamps should not come into final engagement with the panel at any point where it is held completely rigid. Preferably they should come into final engagement with the panel on a transverse line spaced a few inches beyond the point of its final engagement with the flattening means. Although the panel will remain substantially flat along this transverse line, the individual boards will have sufficient flexibility to permit them to readjust themselves under clamping pressure into flush joint line engagement with adjacent boards.

There may be, in one or more of the individual boards making up a panel assembly, certain inequalities which are of such a nature that, when the panel is clamped, the inequalities cause the boards to lengthen out. If such a panel were to be simultaneously clamped along its entire length, this natural tendency of the boards to lengthen may be more or less prevented by the pressure with which they are clamped, causing a strain to be "locked in" the panel. On the other hand, where, as in my machine, a succession of side clamps are provided for successively engaging successive side portions of the panel to effect a progressive clamping of the panel, the boards adjust themselves progressively as clamping pressure is applied and thus minimize the formation of strains in the panel.

Normally clamping pressures as low as 10 to 15 lbs. per square inch will produce a good glue joint. With the present machine, using 1000 pound compression spring clamps spaced on 6" centers, the clamping pressure will normally range from 40 to 60 pounds per square inch more or less depending upon various factors. Once the clamping pressure is applied, it should be retained continuously at the same constant value during the curing or the setting of the glue. Since the types of glue that may be used are well known, it should suffice to say that most, if not all of the presently available commercial urea-formaldehyde resins, in liquid or plastic form, may be employed as a bonding agent herein. These resins will cure or set rapidly under the application of high frequency energy to provide a good bond. The strength of this bond, as the panel leaves the setting area, will normally approximate 40% of its ultimate strength but such strength will rise within 1 to 2 hours to a value approximating 80 to 90% of the ultimate strength of the bond. The condition and strength of the bond at the delivery end is such that the panels can be processed immediately through other operations. It can even be surfaced although surfacing to a final finish is not recommended at this point. The variable speed of the machine permits accurate coordination of the operation of the machine with preceding or succeeding operations.

It will be appreciated that the present machine eliminates the manual clamping, flattening and releasing operations of the batch and radial type of panel-forming device heretofore employed. It is capable of receiving automatically fed panels; hence may eliminate the manual feeding operation. It automatically delivers the finished panels; hence may be arranged to avoid a manual operation at the delivery end. It is relatively compact, this being due in some measure to the fact that it is capable of rapid operation. When properly operated it enables bonded panels to be rapidly produced at a cost approximating 70% of the cost of producing the same panels on the radial type of machine.

Since the machine herein disclosed leaves one face of a clamped board assembly openly exposed and accessible, it may be used for other operations on or treatments of a board assembly, such as painting the assembly, etc. Furthermore, it may be used in connection with assemblies or other boards-like elements; hence the terms "board" or "board-like" are not herein limited to wood boards. The board assemblies may be solid assemblies, such as table tops, floor strips, and the like or open frame-like assemblies such as the frames of glass panel doors and the like. The terms "glue-like medium" and "settable or curable glues" as used herein designates any liquid or plastic bonding substance which will cure, set or otherwise solidify in bonding two surfaces together.

This application discloses the same subject matter as my copending application Serial No. 673,544, filed May 31, 1946, and now abandoned, but the claims in this case are directed to an apparatus combination and to a clamp subcombination.

Having described my invention, I claim:

1. A panel forming machine of the continuous planar type presenting an upwardly-facing planar surface extending along a path having flattening, clamping, glue-setting and releasing areas comprising: means for moving an assembly of abutting boards, having their abutting surface precoated with an unset glue-like medium, along said path with the bottom of the assembly in engagement with said surface; means for flattening said assembly upon said surface in the flattening area; side clamping means for successively engaging successive oppositely-disposed side edge portions of the flattened assembly in the clamping area to effect a progressive clamping of the panel along its length with the clamping pressure exerted in a direction transverse to the path of assembly movement, said means operating to maintain said assembly in a clamped condition as it moves through the setting area; and means for releasing the assembly at the releasing area.

2. The machine of claim 1 wherein: said side clamping means successively engage said side portions as such portions successively move into the clamping area.

3. Apparatus for conveying materials to be treated through a treating zone, such as conveying pieces of wood having glued edges in adjacent relation through a glue-setting zone, comprising: a continuously moving endless conveyor providing a supporting plane and having a feed end and a discharge end; treating means adjacent the path of the conveyor between said ends; means including a series of clamps mounted on the conveyor and spaced along the direction of travel thereof for maintaining the conveyed material under compression in a direction substantially transverse of the conveyor path during its travel through the treating zone; and means adjacent the ends of the conveyor to open the clamps to receive and release the material.

4. Apparatus for conveying materials to be treated through a treating zone, such as conveying pieces of wood having glued edges in adjacent relation through a glue-setting zone, comprising: an endless conveyor providing a supporting plane; transverse clamping means on said conveyor mounted to move therewith; means to feed a plurality of pieces of wood with the glued edges thereof in adjacent relation onto said conveyor adjacent one end thereof; and means effective on the continued movement of the conveyor to open and close said clamping means at the region of feed of the wood to receive and clamp the material therein.

5. The apparatus of claim 4 wherein the clamping means includes a series of spaced clamps, each clamp including a pair of opposed material-engaging sections, and resilient means to maintain said sections yieldably in clamping relation.

6. Apparatus for clamping a transverse series of longitudinally extending boards in edgewise relationship to form a composite board having an overall width equal to the aggregate width of the individual boards, comprising: a frame; an endless conveyor mounted on the frame presenting a horizontally disposed, upwardly-facing supporting surface traveling horizontally forward from the feed end to the discharge end, said conveyor being adapted at the feed end to receive a transverse series of boards, each of which extends longitudinally in the direction of conveyor travel, said boards having their adjacent longitudinal edges precoated with an unset glue; means on the frame adjacent the feed end of the conveyor for pressing the boards downwardly against the supporting surface of the conveyor; a series of longitudinally spaced clamps carried by the conveyor, each clamp having a pair of transversely spaced clamping members arranged for relative transverse movement between a minimum position wherein they cooperate to form a transverse opening which is narrower than the aggregate width of said boards to an extended position wherein they cooperate to form a transverse opening which is wider than the aggregate width of said boards; means for causing the clamping members of each clamp to move relatively toward said minimum position as they move into the feed end of the conveyor so as to clamp and compress in edgewise relationship such boards as may then be on the corresponding feed section of the conveyor, and to remain in said clamping position as the glue sets; and means adjacent the discharge end of the conveyor to release said boards.

7. The apparatus of claim 6 wherein the clamp moving means comprises: resilient means for constantly urging one of the clamp members toward one of its positions, and means mounted on the frame for engaging the clamp member and moving it toward its other position.

8. A panel-forming machine for receiving an assembly of abutting boards having an unset glue-like medium between the abutting surfaces to be bonded together and for holding the assembled boards while the glue sets and bonds the precoated abutting surfaces together to unify the assembly comprising: a frame; a frame-mounted endless movable conveyor having forward and rearward runs extending between its rear and front ends with its forward run presenting an upwardly facing substantially planar board supporting surface arranged to receive said assembly and to carry it, upon conveyor movement, over a predetermined planar path extending successively through flattening, clamping and setting areas to a releasing area; drive means for moving said conveyor; means over the flattening area of the conveyor for pressing the assembly boards flatly against said planar surface and maintaining them in flat and uniform engagement therewith as they enter the clamping area; an endless succession of clamps spaced along and mounted on the conveyor for longitudinal movement therewith through said areas, each clamp extending transversely across the conveyor and including opposed transversely spaced clamp members, one on each side of the path of movement of the board assembly through said areas; and means for successively operating each clamp to move each pair of opposed clamp members relatively toward each other as they enter the clamping area so as to place them in predetermined compressive clamping engagement with the corresponding side portions of a panel positioned between them, for holding each pair uniformly in such engagement as they pass through the setting area where the glue-like medium bonds the abutting surfaces together to unify the assembly and for moving them relatively away from each other as they enter the releasing area so as to release the corresponding portion of the unified assembly.

9. A panel forming machine for receiving an assembly of abutting boards having an unset glue-like medium between the abutting surfaces to be bonded together and for holding the assembled boards while the glue sets and bonds the precoated abutting surfaces together to unify the assembly comprising: a frame; a conveyor mounted on said frame for movement along an endless path having forward and rearward runs, said conveyor having a succession of crossbars extending transversely across the conveyor from one side to the other and cooperating with each other on the forward run to form an upwardly-facing substantially planar transversely-slotted board engaging and conveying surface extending continuously from a receiving area through a glue-setting area to a releasing area, said conveyor being arranged to receive and support said assembly flatly on said planar surface at said receiving area and operative to carry the assembly flatly on said surface over a predetermined planar path extending from said receiving area through said glue-setting area to said releasing area; drive means for moving said conveyor; clamping means on the conveyor including a succession of clamps mounted on said bars for movement with the conveyor, each clamp having a pair of opposed transversely spaced clamping members which, on the forward run of the conveyor, are positioned to travel forwardly along opposite sides of said planar path and to project upwardly from said planar surface, said clamping members being relatively movable transversely along said slots toward and away from each other; and means on the frame cooperating, upon conveyor movement, with said clamping means on the conveyor to move the clamping members transversely relatively toward each other at the receiving area to a clamping position in which they compressively engage opposite side edges of an assembly lying on the planar surface between them, to hold said members in said clamping position as they move forwardly through the setting area and to move said members transversely relatively away from each other at the releasing area to an assembly releasing position.

10. The machine of claim 9 wherein said cross bars are in the form of outwardly open U-shaped channels, the outer transverse edges of which are laterally flanged to form said planar surface.

11. The machine of claim 9 wherein: one clamping member of each pair is mounted on the conveyor adjacent one side thereof to provide a relatively stationary abutment for one side of a board assembly in clamping position; each clamp includes a transverse extension slidably mounted on the conveyor for limited transverse movement relatively to said stationary clamp abutment and between positions corresponding to the extreme clamping and releasing positions; the other clamping members of each pair is slidably mounted on said conveyor for relative transverse movement, said other member being transversely adjustable along and securable to said extension in any of a number of adjusted positions within a limited range to accommodate board assemblies of a corresponding range of different widths, said other clamping member being, in each adjusted position, transversely movable with said extension into and out of clamping position; each clamp includes a spring urging said extension and said other clamping member yieldably toward one of said extreme positions; and said cooperating means on frame includes a cam-like abutment operative to move said extension and said other clamping member toward the other of said extreme positions against the action of said spring.

12. The machine of claim 11 wherein: each clamp includes a latch member movably mounted on said other clamping member to latch it to and unlatch it from said extension in each of its adjusted positions, each latch member being operative to move gravitationally into and out of latching position adjacent the beginning of the forward and return runs respectively of the conveyor.

13. The machine of claim 9 wherein: each clamp includes a spring urging the clamping members toward each other; and the cooperating means on the frame includes a stationary cam-like abutment mounted on the frame adjacent one end of the forward run in position to engage and operate successive clamps to their open position.

14. The machine of claim 13 wherein: a stationary thrust abutment is mounted on the frame opposite said cam-like abutment and in position to engage and support successive clamps against end thrust effected by said cam-like abutment.

15. In combination: a conveyor; a transversely arranged stay bar secured to move with said conveyor and having a relatively stationary work abutment adjacent one end; a bar slidable relative to said stay bar and transversely of the conveyor; a work engaging jaw slidably supported by said stay bar and adjustably secured to said slidable bar; means resiliently biasing said jaw towards said stationary abutment; and means along the path of the conveyor for moving said slideable bar against the bias of said resilient means.

16. An apparatus as specified in claim 15 wherein said slidable bar carries a series of notches, and said jaw carries a detent adapted to engage one of said notches.

17. An apparatus as specified in claim 16 wherein said detent is maintained in engagement with a notch by gravity, and wherein said detent disengages said notch on the return run of the conveyor.

18. In combination: a conveyor; a plurality of transverse work supporting members carried by said conveyor in spaced relation, each member having a fixed work abutment at one end; an assembly for each member comprising a bar carried by the member and slidable relative thereto transversely of the conveyor, a work engaging jaw slidably supported by said member and adjustably secured to said bar, and means resiliently biasing said bar in one direction; means along the path of movement of said conveyor for moving said bar against the bias of said resilient means to move said jaw away from the abutment; means opposite said last mentioned means to engage said member; and means along the path of the conveyor for adjusting said jaw relative to said bar.

19. A clamp comprising: a work supporting member adapted to be secured to a conveyor, and having a stationary work abutment adjacent one end; a roller carrier at one end of said member; a bar slideable in said work supporting member; a work engaging jaw adjustably secured to said bar and slidably supported by said work supporting member; means resiliently biasing said jaw towards said stationary work abutment member; and a roller carried at the one end of said bar.

20. A clamp comprising: a flanged channel member adapted to be secured to a conveyor; an abutment member secured in said channel member and extending therefrom, and adapted to be engaged by the material to be clamped; a roller carried at the other end of said channel member; a bar extending through said abutment member into the channel member and provided with a series of perforations; spring means biasing said bar outwardly; an anti-friction member carried at the outer end of said bar; a clamping jaw embracing said flanges and freely slidable on said channel member; and releasable means cooperating with said perforations for securing said clamping jaw to said bar.

CORNELIUS D. DOSKER.

References Cited in the file of this patent

UNITED STATES PATENTS

| Number | Name | Date |
|---|---|---|
| 116,496 | Russ | June 27, 1871 |
| 196,327 | Benjamin | Oct. 23, 1877 |
| 522,475 | Lyon | July 3, 1894 |
| 909,530 | Borg | Jan. 12, 1909 |
| 996,187 | Wilson | June 27, 1911 |
| 1,027,419 | Hines | May 28, 1912 |
| 1,050,521 | Cunning | Jan. 14, 1913 |
| 1,108,946 | Thorschmidt | Sept. 1, 1914 |
| 1,455,433 | Ellrich | May 15, 1923 |
| 1,577,744 | Gould | Mar. 23, 1926 |
| 1,578,898 | Littleford | Mar. 30, 1926 |
| 1,643,194 | Black | Sept. 20, 1927 |
| 1,693,606 | Jones | Dec. 4, 1928 |
| 1,799,135 | Roberts | Mar. 31, 1931 |
| 1,896,113 | Steurnagel | Feb. 7, 1933 |
| 2,080,462 | Cranston | May 18, 1937 |
| 2,231,457 | Stephen | Feb. 11, 1941 |
| 2,346,039 | Montague | Apr. 4, 1944 |
| 2,408,064 | Hall | Sept. 24, 1946 |
| 2,433,067 | Russell | Dec. 23, 1947 |